United States Patent
Knee

(10) Patent No.: US 10,614,550 B2
(45) Date of Patent: Apr. 7, 2020

(54) DECODING A BAYER-MASK OR LIKE CODED IMAGE

(71) Applicant: Snell Advanced Media Limited, Newbury, Berkshire (GB)

(72) Inventor: Michael James Knee, Petersfield (GB)

(73) Assignee: SNELL ADVANCED MEDIA LIMITED, Newbury, Berkshire (GB)

( * ) Notice: Subject to any disclaimer, the term of this patent is extended or adjusted under 35 U.S.C. 154(b) by 167 days.

(21) Appl. No.: 15/899,036

(22) Filed: Feb. 19, 2018

(65) Prior Publication Data

US 2018/0240214 A1    Aug. 23, 2018

(30) Foreign Application Priority Data

Feb. 17, 2017 (GB) .................................. 1702627.9

(51) Int. Cl.
*G06K 9/00* (2006.01)
*G06T 3/40* (2006.01)
(Continued)

(52) U.S. Cl.
CPC .............. *G06T 3/4015* (2013.01); *G06T 7/90* (2017.01); *G06T 9/00* (2013.01); *H04N 9/04515* (2018.08);
(Continued)

(58) Field of Classification Search
CPC ....... G06T 3/4015; G06T 3/4038; G06T 7/90; G06T 9/00; G06T 2207/20004; G06T 2207/20024; H04N 9/045; H04N 9/0451; H04N 9/04515; H04N 9/04563; H04N 2209/046
(Continued)

(56) References Cited

U.S. PATENT DOCUMENTS 6,781,626 B1 * 8/2004 Wang ...................... H04N 9/045
                                                   348/222.1
7,653,240 B1   1/2010   Otobe et al.
(Continued)

FOREIGN PATENT DOCUMENTS

EP         1050847 A2    11/2000
EP         2293238 A2    3/2011

OTHER PUBLICATIONS

Search Report from the United Kingdom Intellectual Property Office for Application No. GB1702627.9 dated Aug. 4, 2017 (1 page).
(Continued)

*Primary Examiner* — Eric Rush
(74) *Attorney, Agent, or Firm* — Arent Fox LLP

(57) ABSTRACT

A Bayer-mask image is decoded by forming a decoded green array; calculating a slope at each pixel of the array, expressed as an angle; calculating an activity at each pixel; converting the slope angle and the activity into a complex number for each pixel, of modulus equal to the activity and argument equal to twice the slope angle; expressing said complex numbers in Cartesian coordinates to form a Cartesian slope signal and filtering the Cartesian slope signal with a linear spatial filter to derive a slope measure. Blue-green and red-green values are calculated and interpolated using a slope-adaptive interpolation filter steered by said slope measure.

17 Claims, 3 Drawing Sheets

(51) Int. Cl.
*H04N 9/04* (2006.01)
*G06T 7/90* (2017.01)
*G06T 9/00* (2006.01)

(52) U.S. Cl.
CPC .............. *G06T 2207/20024* (2013.01); *H04N 2209/046* (2013.01)

(58) Field of Classification Search
USPC ....... 382/162, 166, 167, 233, 254, 260, 261, 382/298–300, 325; 358/518, 525; 348/659, 661; 345/589, 600, 603, 604, 345/606
See application file for complete search history.

(56) References Cited

U.S. PATENT DOCUMENTS

| | | | | |
|---|---|---|---|---|
| 8,111,299 B2* | 2/2012 | Lukac | ................... | G06T 3/4015 382/162 |
| 8,422,771 B2* | 4/2013 | Tamburrino | ........... | H04N 9/045 382/162 |
| 2008/0240559 A1* | 10/2008 | Malvar | ................. | G06T 3/4015 382/167 |
| 2009/0010539 A1* | 1/2009 | Guarnera | .............. | G06T 3/4015 382/167 |
| 2009/0066821 A1* | 3/2009 | Achong | ................. | H04N 9/045 348/273 |
| 2009/0252408 A1* | 10/2009 | Shi | ......... | H04N 9/045 382/167 |
| 2011/0032396 A1* | 2/2011 | Park | ...................... | G06T 3/4015 348/273 |
| 2011/0090242 A1 | 4/2011 | Cote et al. | | |

OTHER PUBLICATIONS

Freeman, William T. et al., "Steerable Filters for Early Vision, Image Analysis, and Wavelet Decomposition", The Media Laboratory and Dept. of Brain and Cognitive Sciences, 1990, pp. 406-415, Massachusetts Institute of Technology, Cambridge, MA.

Huang, Yea-Shuan et al., "Effective Color-Difference-Based Interpolation Algorithm for CFA Image Demosaicking", Department of Computer Science Information Engineering, Part I, 2011, pp. 457-469, Chung Hwa University, Hsinchu, Taiwan.

Extended European Search Resort from the European Patent Office for Application No. 18157494.8 dated Jun. 29, 2018 (11 pages).

* cited by examiner

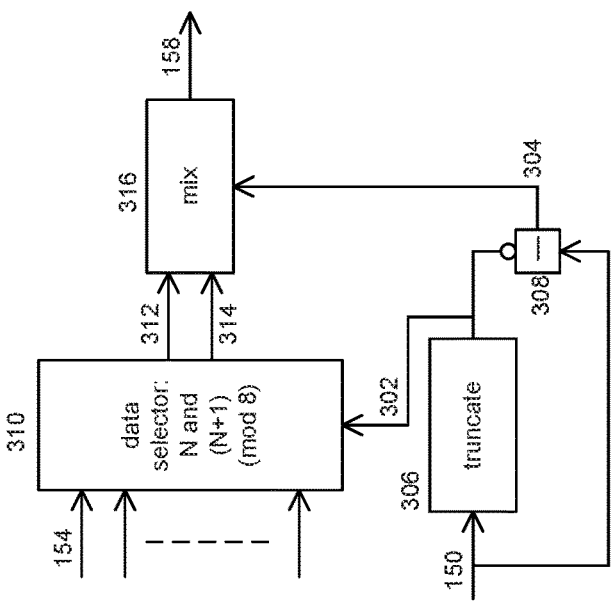
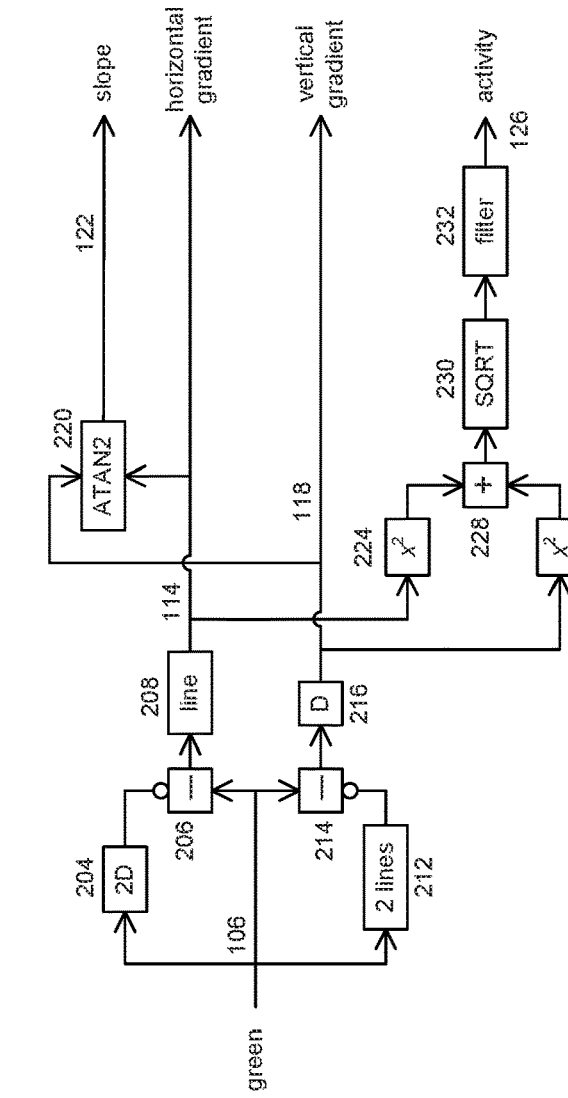
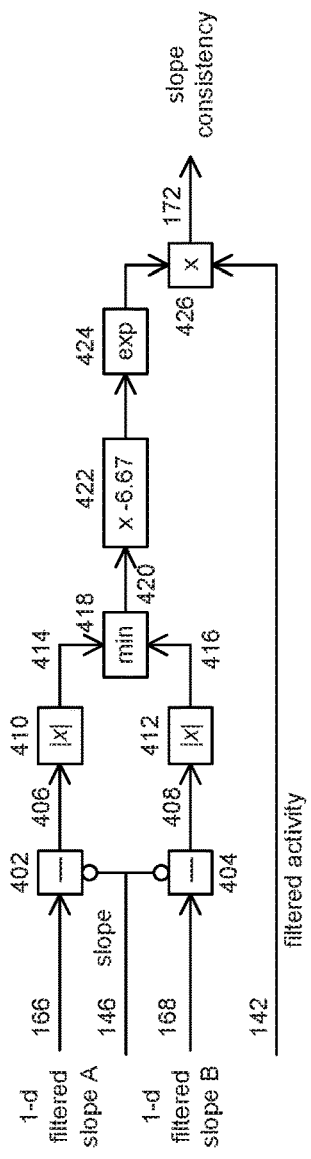

DECODING A BAYER-MASK OR LIKE CODED IMAGE

FIELD OF THE INVENTION

This invention relates to the decoding of color components, for example a Bayer-mask or like coded image.

BACKGROUND OF THE INVENTION

A Bayer mask is typically used to allow color component signals to be derived from any array of CCD or other sensing elements, which do not in themselves discriminate color. A Bayer mask will typically be used to derive red (R), green (G) and blue (B) signals and comprises a rectangular array of R, G and B filters. Since the human eye is more sensitive to brightness than color, and since the green signal contributes most to the perception of brightness, G filters predominate in the Bayer mask and are quincunxially sampled.

A Bayer mask decoder is used to convert a Bayer mask signal (which has for each sensing element—or pixel—only one of the three R, G and B signals) to an image signal which has at each pixel an R signal, a G signal and a B signal.

It is well known that cross-color and "barber's pole" artefacts can result from basic Bayer mask decoders.

Many suggestions have been made for producing more sophisticated Bayer mask decoders and reducing these artefacts. Reference is directed, for example, to GB2426881A which discloses a decoder based on non-adaptive linear filters. This decoder performs well on the G component but exhibits cross-color artefacts on the more sparsely sampled R and B components.

SUMMARY OF THE INVENTION

There is here provided a method of decoding a Bayer-mask or like coded image comprising a value for one of a set of colors at each pixel of the image to provide a decoded value for each of the set of colors at each pixel of the image, comprising the steps of deriving from the coded image an array having for a selected color a value at each pixel of the image; calculating a slope at each pixel of the array, expressed as an angle; calculating an activity at each pixel; converting the slope angle and the activity into a complex number for each pixel, of modulus equal to the activity and argument equal to twice the slope angle; expressing said complex numbers in Cartesian coordinates to form a Cartesian slope signal and filtering the Cartesian slope signal with a linear spatial filter to derive a slope measure, preferably quantised to 4, 8, 16 or more possible values; calculating from the array a color difference signal at each of the pixels associated with other colors; and interpolating color difference signals using a slope-adaptive interpolation filter steered by said slope measure.

Typically, the selected color is green and the other colors are red and blue.

The step of calculating an activity at each pixel may comprise measuring a gradient or more specifically forming the absolute value of a gradient at each pixel and applying a spatial filter.

The step of interpolating may comprise combining pairs of opposite one-sided filters. The interpolation output may be taken from the filter pair corresponding to the quantized slope angle. The interpolation output is a cross-fade between the filter pairs corresponding to the two nearest slope angles.

Advantageously, the Cartesian slope signal may be filtered using the one-sided filters to generate a slope consistency signal. A mix can then be formed between a linearly decoded image and the output of the interpolating step, controlled by that slope consistency signal.

BRIEF DESCRIPTION OF THE DRAWINGS

The invention will now be described by way of example with reference to the accompanying drawings in which:

FIGS. 3, 4 and 5 are diagrams illustrating in more detail parts of the apparatus shown in FIG. 2.

DETAILED DESCRIPTION OF THE EMBODIMENTS

Figure 1:
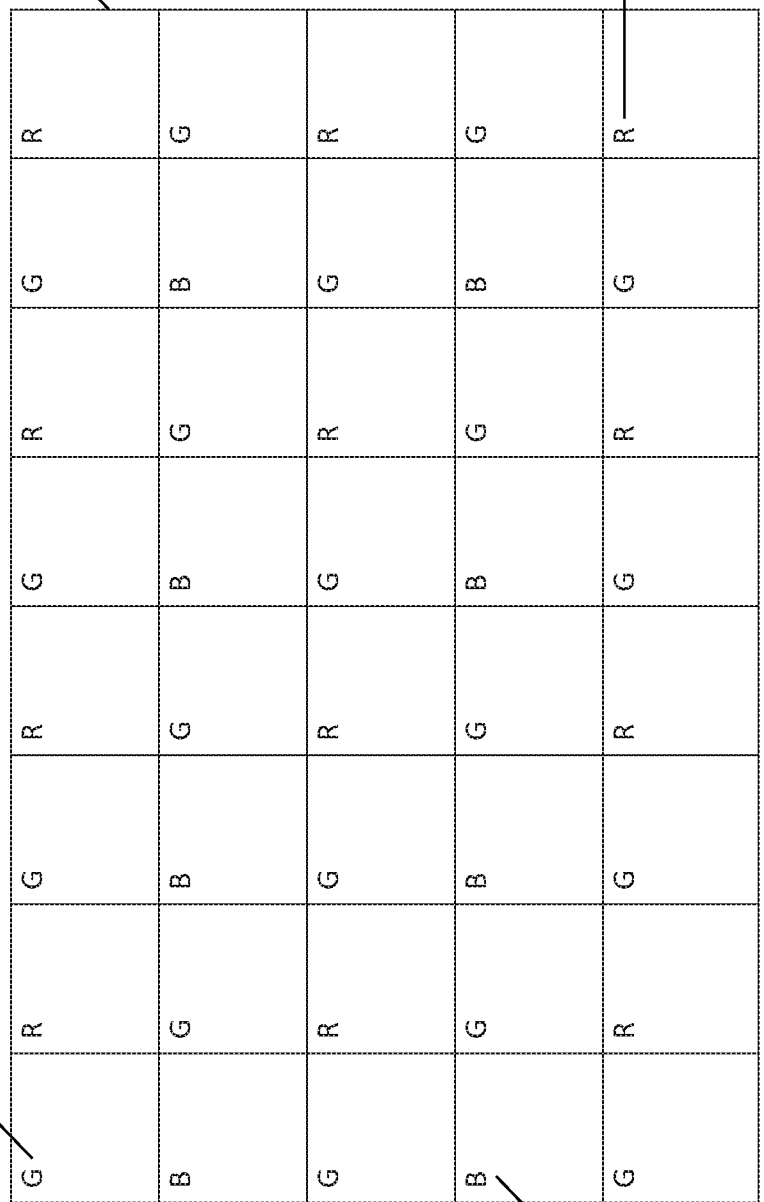
FIG. 1 is a schematic representation of a Bayer mask or Bayer mask image.

Referring to FIG. 1, it will be seen that a Bayer mask has a quincunxial arrangement of green elements. Alternating rows have red and blue elements, respectively, in the spaces between the green elements. The corresponding Bayer mask signal or image then has quincunxial green samples or pixels with alternating rows have red and blue samples or pixels, respectively, in the spaces between the green samples or pixels. It will be understood that a Bayer mask signal can be formed in ways other than positioning a Bayer mask in front of a sensor array. It will also be understood that although the Bayer mask is widely used in video, there are other forms of coded images comprising a value for one of a set of colors at each pixel of the image and requiring decoding to provide a decoded value for each of the set of colors at each pixel of the image.

Figure 2:
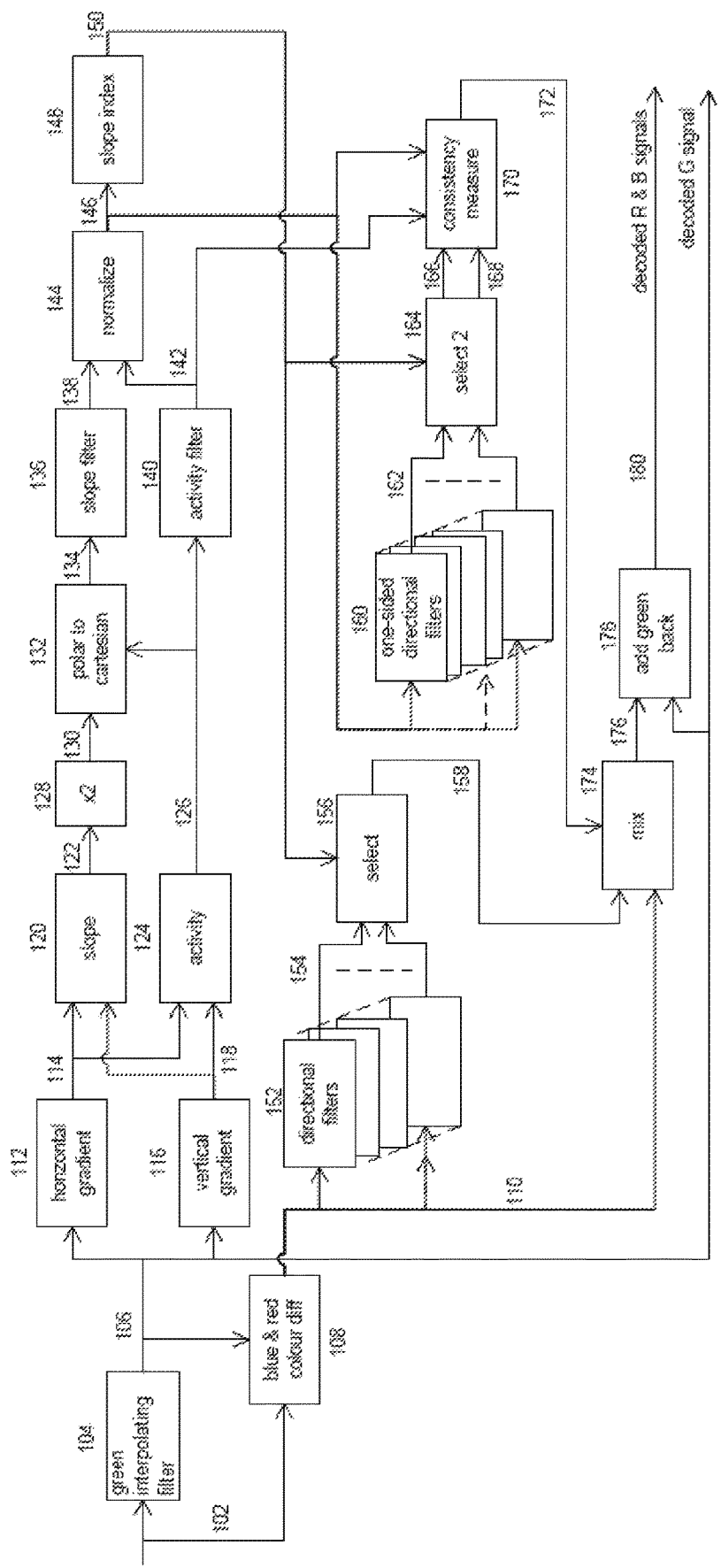
FIG. 2 is a diagram illustrating apparatus according to the invention.

FIG. 2 shows a decoder circuit which receives as its input a Bayer mask image as illustrated in FIG. 1 and which outputs decoded R, B and G signals, each having a value at each pixel.

It should be noted in the following descriptions that compensating delays are not always shown, and where not shown are assumed to have been applied where necessary at the inputs to any circuits where two or more signals are combined.

Referring to FIG. 2, a Bayer-mask signal 102 is filtered in two-dimensional filter 104 to generate a full-resolution grid of green samples 106.

An example filter 104 is shown below (with the quoted values to be divided by 32) with zeros placed at the off-grid input sample locations.

| −2 | −2 | −1 | −2 | −2 |
|---|---|---|---|---|
| −2 | 4 | 12 | 4 | −2 |
| −1 | 12 | 28 | 12 | −1 |
| −2 | 4 | 12 | 4 | −2 |
| −2 | −2 | −1 | −2 | −2 |

Thus, when this 5 by 5 filter is centred on a B or R pixel, the operating values are:

|  | −2 |  | −2 |  |
|---|---|---|---|---|
| −2 |  | 12 |  | −2 |
|  | 12 |  | 12 |  |
| −2 |  | 12 |  | −2 |
|  | −2 |  | −2 |  |

And when the filter is centred on a G pixel, the operating values are:

|    |   |    |   |    |
|----|---|----|---|----|
| −2 |   | −1 |   | −2 |
|    | 4 |    | 4 |    |
| −1 |   | 28 |   | −1 |
|    | 4 |    | 4 |    |
| −2 |   | −1 |   | −2 |

It will be noted that this filter example, in addition to providing G values at the R and B sites, also applies some, relatively weak, filtering of the G samples.

Next, the input signal 102 is processed in circuit 108 to form color difference signals R-G and B-G (110). The color difference circuit 108 consists of a subtractor operating at the input R and B sample sites which subtracts the G samples 106 at those sites from the R and B samples, followed by a bilinear interpolator well known in the art to generate a complete grid 110 of R-G and of B-G samples.

The full-resolution green signal 106 is applied to a horizontal gradient circuit 112 to produce a horizontal gradient signal 114, and to a vertical gradient circuit 116 to produce a vertical gradient signal 118. The two gradient signals 114 and 118 are applied to a slope calculation circuit 120 to produce a slope signal 122 and to an activity calculation circuit 124 to produce an activity signal 126.

The operation of circuits 112, 116, 120 and 124 will now be described in greater detail with reference to FIG. 3. The full-resolution G signal 106 is subtracted across a 2-sample delay 204 by subtractor 206 and passed through a one-line compensating delay 208 to produce the horizontal gradient signal 114. It is also subtracted across a 2-line delay 212 by subtractor 214 and passed through a one-sample compensating delay 216 to produce the vertical gradient signal 118. The slope angle signal 122 is calculated from the gradient signals 114 and 118 by means of the well-known ATAN2 function (220), which calculates the arctangent of a ratio between two numbers with provision for the divisor being very small or zero. The gradient signals are also passed through squaring circuits 224 and 226, then added together in adder 228, then the square root taken in circuit 230 and then filtered in filter circuit 232 to produce the activity signal 126. The process of conversion from gradient signals to slope angle and activity is in fact a Cartesian to polar coordinate conversion process.

An example of the filter circuit 232 is a [1 2 1]/4 aperture applied horizontally and then vertically.

There follows a filtering process on the slope signal. The problem with filtering an angle is that of phase wraparound—the fact that an angle just above −π is very close to an angle just below +π. This can be solved by going back to Cartesian coordinates. However, in handling the slope there is an additional wraparound problem because slopes differing by π should be considered to be equal, that is to say they should be processed modulo π, The solution is to double the original slope angles, then convert back to Cartesian coordinates prior to filtering. The slope values are effectively weighted with the activity prior to filtering, by including the activity in the coordinate conversion process.

Returning to FIG. 2, the slope angle signal 122 is multiplied by 2 in circuit 128 to produce a new angle signal 130. Expressing the angle 130 together with the activity 126 in polar coordinates, the next step is to convert from polar to Cartesian coordinates in conversion circuit 132 to produce a Cartesian representation of an activity-weighted slope 134. This signal, which can be considered as a complex number, is filtered in slope filter circuit 136 to produce a filtered slope signal 138. A suitable aperture for the filter 136 is [1 2 2 2 1]/8 applied first horizontally, then vertically.

The activity signal 126 is also filtered in activity filter circuit 140 to produce a filtered activity signal 142. A suitable aperture for this filter is also [1 2 2 2 1]/8 applied first horizontally, then vertically.

A normalization step is then carried out in which the filtered slope signal 138 is divided by the filtered activity signal 142 in a normalization circuit 144 to produce a normalized slope signal 146.

The normalized slope signal 146 is converted in circuit 148 to a slope index signal 150 which is in the range [0, 8). The action of circuit 148 is first to recover an angle from the slope signal using the ATAN2 function, then to take the angle modulo π (effectively undoing the multiplication by 2 carried out in circuit 128), and finally to rescale linearly from the range [0, π) to [0, 8) to obtain the slope index signal 150.

The slope index controls the application of a set of "directional filters" which are based on a one-dimensional low-pass filter rotated at appropriate intervals. There may as examples be 2, 4, 8, 16 or 32 directional filters. With the example of 16 filters, which may be an advantageous compromise between complexity and accuracy, the filters will be spaced by n/8 or 22.5°. The use of one-sided filters enables the creation of a "slope consistency measure" as discussed.

Here is an example of a resulting one-sided directional filter with an angle of 0°:

| 0  | 0 | −1 | −2 | −2  | −2  | −2  | −2  | −2  | −2 | −1 | 0 |
|----|---|----|----|-----|-----|-----|-----|-----|----|----|---|
| 0  | 1 | 8  | 15 | 16  | 16  | 16  | 16  | 16  | 15 | 8  | 1 |
| −1 | 5 | 50 | 95 | 100 | 100 | 100 | 100 | 100 | 95 | 50 | 5 |
| 0  | 1 | 8  | 15 | 16  | 16  | 16  | 16  | 16  | 15 | 8  | 1 |
| 0  | 0 | −1 | −2 | −2  | −2  | −2  | −2  | −2  | −2 | −1 | 0 | and another with an angle of +22.5°:

| 0  | 0 | 0  | 0  | 0  | 0  | 0  | 0   | 0  | −1 | 0  | 0  |
|----|---|----|----|----|----|----|-----|----|----|----|----|
| 0  | 0 | 0  | 0  | 0  | 0  | −1 | −3  | −3 | 7  | 4  | −1 |
| 0  | 0 | 0  | 0  | −2 | −4 | 1  | 28  | 71 | 71 | 19 | −1 |
| 0  | 0 | −2 | −4 | 9  | 45 | 87 | 101 | 74 | 27 | 1  | 0  |
| 0  | 0 | 15 | 63 | 98 | 94 | 55 | 16  | −2 | −3 | 0  | 0  |
| −1 | 5 | 51 | 75 | 38 | 5  | −4 | −2  | 0  | 0  | 0  | 0  |
| 0  | 0 | 6  | −1 | −4 | −1 | 0  | 0   | 0  | 0  | 0  | 0  |
| 0  | 0 | −1 | 0  | 0  | 0  | 0  | 0   | 0  | 0  | 0  | 0  |

In these examples, the coefficients are expressed as multiples of 1/1024. Moreover, in these examples, the coefficient having a value of "50" (i.e., for the one-side direction filter with an angle of 0°) and a value of "51" (i.e., for the one-side direction filter with an angle of +22.5°) correspond to the current sample location (i.e. is the zero-delay coefficient).

Referring again to FIG. 2, each filter in the set 152 of directional filters generated as described above is applied in parallel to the color-difference signals 110 to produce a set 154 of directionally filtered color difference signals. The slope index signal 150 is then used to select an appropriate output from the directionally filtered signals in selection circuit 156 to produce "raw" directionally decoded color difference signals 158.

The operation of the selection circuit 156 will now be described in more detail. Referring to FIG. 4, the slope index 150 is split into integer (302) and fractional (304) parts by the action of truncation circuit 306 and subtractor 308. The integer part 302 controls the selection of two of the directionally filtered color difference signals 154 in data selector 310. The two signals selected (312, 314) are those indexed by the integer part 302, denoted as N, and by the next one in a circular list, (N+1) (mod 8). The fractional part 304 then controls a mix in a well-known mixing circuit 316 between the two selected signals 312 and 314 to produce the directionally decoded signal 158. The action of the mixing circuit is to produce a linear mix between the two signals such that the output varies linearly between signals 312 and 314 as the fractional part varies between 0 and 1.

In a simpler version of the selection circuit, the truncation circuit could be replaced by a rounding circuit and the data selector selects a single output based on the rounded slope index.

The steered interpolation function has been described using directional filters applied in parallel. It will be seen that only two or even one filter outputs are ultimately used for each sample. Equivalent implementations, for example those realised in software, may, without departing from the scope of this invention, generate only those filter outputs that are ultimately required.

Note that all the main signal paths of the steered interpolation function are in fact two parallel color difference signals processed identically.

The raw directionally decoded color difference signals 158 are further modified as a function of a slope consistency measure which will now be described.

Referring again to FIG. 2, the normalized Cartesian slope signal 146 is passed to each of the 16 one-sided directional filters described above to produce filtered signals 162. The slope index signal 150 controls the selection in circuit 164 of the outputs (166, 168) corresponding to two diametrically opposing directions. The operation of selection circuit for each of the two outputs is similar to that of the selection circuit 156 already described.

The two opposing one-sided signals 166 and 168, together with the unfiltered slope signal 146 and the filtered activity signal 142, are passed to a slope consistency measurement circuit 170 to produce a slope consistency signal 172.

The operation of the slope consistency measurement circuit 170 will now be described in more detail. Referring to FIG. 5, differences between each of the one-sided signals 166 and 168 are taken from the unfiltered slope signal 146 in subtractors 402 and 404 to produce difference signals 406 and 408, whose absolute values are taken in circuits 410 and 412 to produce signals whose lower value is then taken in circuit 418 as minimum-value signal 420. This signal is in turn multiplied by −6.67 in circuit 422, exponentiated in circuit 424 and multiplied by the filtered activity 142 in multiplier 426 to produce the final slope consistency signal 172.

Referring again to FIG. 2, the slope consistency signal 172 is used in mixing circuit 174 to control a mix between the unprocessed color difference signals 110 and the raw directionally decoded color difference signals 158 to produce final decoded color difference signals 176. The operation of the mixer 174 is such that the output varies linearly from input 110 to input 158 as the control signal 172 varies from 0 to 1.

Finally, the decoded color difference signals 176 is added to the decoded green signal 106 in adding circuit 178 to produce final decoded red and blue signals 180.

The activity signal 126 is determined by summing the squares of both signals 114 and 188. The sum of these signals is then square rooted and filtered to determine the activity signal 126.

It will be understood that a number of the operations performed by the above described apparatus can be omitted in certain applications and that the filter coefficients and other parameters of the described circuits are given by way of example only.

In a more general sense, a process to be performed by apparatus according to the invention might include the following steps:

1. First, a full-resolution grid of green samples is calculated using any appropriate method. This will provide the decoded green signal 2. Calculate the local (pixel-based) slope (expressed as an angle) of the decoded green signal using in one example a simple ratio of local vertical and horizontal gradients.

3. Calculate the local activity as an absolute value for each pixel, which may be filtered with a simple spatial filter, 4. Filter the slope angle using an activity-weighted filtering technique. For example, convert the slope angle and the filtered activity into a complex number for each pixel, of modulus equal to the activity and argument equal to twice the slope angle. Expressing this signal in Cartesian coordinates, filter it with a linear spatial filter, and normalize the result with a further filtered version of the activity signal. Doubling of the slope angle is an important aspect.

5. Calculate color-difference signals B-G and R-G on the blue and red sample grids respectively, using the already decoded co-sited green samples.

6. Apply a number of directional 2:1 upconversion filters to the color-difference signals. The number of directions is determined by the accuracy to which the slope can be measured, and is a trade-off between processing burden and effectiveness of the algorithm. A good working number is 16, corresponding to intervals of $\pi/8$ in the slope angle. The use of one-sided filters may offer advantages. The filters for interpolating R-G and B-G values are identical. In general, interpolation filters are different for different relative phases of the output samples with respect to input samples. Such filters can be thought of in two ways: either (1) a set of different filters, one for each possible phase of the output sample with respect to the input sample, or (2) a compound filter operating on a grid that has been upsampled to the output sample spacing by insertion of zero values where no input sample is present.

7. Pairs of opposite directional filters are combined to make a slope-adaptive interpolation filter for the color-difference signals. The interpolation output can be taken from the filter pair corresponding to a quantized slope angle, or may be a cross-fade between the filter pairs corresponding to the two nearest slope angles.

In a variation:

8. Filter the Cartesian slope signal from step 4 using the one-sided filters to generate a slope consistency signal, which expresses how well a slope-adapted filtering of the slope signal matches the unfiltered signal.

9. The final color-difference output is a soft mix between a simple decoding of the original Bayer signal and the output of the slope-adaptive interpolator of step 7, controlled by the slope consistency signal of step 8.

Mores detail of some of these processes will be given below. Pixels from the original Bayer coded image are referred to as $p_d$ and pixels decoded as above are referred to as $p_2$.

SLOPE AND ACTIVITY MEASUREMENT

Gradients $g_x, g_y$ are calculated for each pixel using for example a [−1 0+1] aperture applied horizontally and vertically. From these a slope and an activity value is generated for each pixel. Expressing the gradient as a complex number, $$g = g_x + ig_y$$

then the slope is given by $$\theta = Arg\ g, \theta \in [0, 2\pi)$$

and the activity measure by $$a = |g|$$

The activity measure is filtered horizontally (with for example a filter [1 2 1]/4) and then vertically (with for example a filter [1 2 1]/4) to make á.

Slope Filtering

Because of the wraparound issues described above, the original slope angle is doubled, and converted back to Cartesian coordinates prior to filtering. The slope values are weighted with the activity prior to filtering. So the signal to be filtered, considered as a complex number, is $$c = áe^{2i\theta}$$

This signal c is filtered horizontally and then vertically with [1 2 2 2 1]/8 and is normalized by dividing by the filtered activity measure á further filtered horizontally and then vertically, also with [1 2 2 2 1]/8, to obtain a filtered complex slope signal ć. The argument of the result is taken modulo π as the filtered slope ś.

The filtered slope is turned into a "slope index" in the range [0, 7):

$$\tilde{s} = \frac{8\acute{s}}{\pi}$$

The slope index controls the application of the "directional filters" which are based on a one-dimensional low-pass filter rotated at appropriate intervals°. The filter coefficients may be calculated as follows. The use of one-sided filters is optional but enables the creation of a "slope consistency measure" as discussed.

Calculation of Directional Filters

The starting point is a one-sided, one-dimensional low-pass filter with coefficients [1 2 2 2 2 2 2 2 1]/16, where the underlined 1 represents the zero-delay filter tap (the time direction of the other coefficients is arbitrary). Considering this filter as a signal in two-dimensional space (surrounded by zeros), it is upconverted by a factor of 16 using a sharp-cut filter. The resulting matrix of coefficients is rotated by multiples of π/8 from 0 to 7, using bilinear interpolation, and then downconverted by 16 in both dimensions. The resulting filters will be applied on a pixel grid to the horizontally and vertically 2:1 subsampled color difference signals R-G and B-G, so each filter has four subsets of coefficients, each corresponding to an output sample phase with respect to the subsampled input. Each of the four subsets is therefore normalized by dividing by the sum of the coefficients within each subset. In principle, the one-sided filters need not be normalized in four phases because they are not being used for interpolation.

The whole process is repeated (notionally at least—further calculations are not required) using a reflected version of the one-sided filter: [1 2 2 2 2 2 2 2 1]/16. The two sets of one-sided filters are used for slope consistency calculations. The directional filter actually used to interpolate the R-G and B-G color difference signals is the average of the two one-sided filters for each direction.

Steered Interpolation

In general, the appropriate phase of two of the directional filters is applied to the interpolation of each sample of the color difference signals. The two filters are those corresponding to the floor and ceiling (modulo 8) of the slope index ś for each pixel. The outputs of the two filters are mixed linearly in proportion to the complement of the fractional part of the slope index. It does not cost too much in picture quality to use only one filter corresponding to the nearest slope. But in most implementations it is probably necessary to apply all filters in parallel anyway, so the additional implementation cost of mixing two filter outputs is low. The resulting color difference signals are added to the interpolated green signal to give interpolated red and blue signals. This result is known as the "raw" directionally decoded picture $p_d$ and is further controlled as a function of the slope consistency measure which will now be described.

Slope Consistency Measure

To measure slope consistency, the one-sided directional filters are each applied to the filtered complex slope signal ć. The integer and fractional parts of the slope index are handled in the same way as for the steered interpolation. The slope consistency a is defined as follows:

$$\alpha = áe^{-6.67\ min\{|F_a(\acute{c})-\acute{c}|, |F_b(\acute{c})-\acute{c}|\}}$$

where $F_a$ and $F_b$ are the one-sided directional filters. The modulus of the slope signal may be set to 1 for this calculation.

Final Output

The final output $p_s$ is a linear mix of the output $p_2$ and the raw decoded picture $p_d$ according to the slope consistency measure:

$$p_s = ap_d + (1-\alpha)p_2$$

It will be understood that a wide variety of modifications are possible without departing from the scope of this invention. Different techniques can be employed for deriving G (or appropriate other color) values at each pixel. Existing sample values can be maintained, with interpolation being used to provide G values at R and B sites. Or, as in the examples above, G values can be interpolated at every pixel. The slope measurement can be made by using the original input, or one color of the original input, rather than the interpolated G values. The slope measurement can take many forms as can the activity measure, using in each case the knowledge of the skilled man. Color difference signals can be interpolated using a variety of slope-adaptive interpolation filters steered in each case by the slope measure.

The invention claimed is:

1. An apparatus for decoding a Bayer-mask or like coded image comprising a value for one of a set of colors at each pixel of the image to provide a decoded value for each of the set of colors at each pixel of the image, the apparatus comprising:

a first interpolation filter configured to derive from the image an array having for a selected color a value at each pixel of the image, said array forming a first decoded color value output;

a slope detector configured to calculate a slope at each pixel of the array, expressed as a slope angle;

an activity measure configured to calculate an activity at each pixel;

a converter configured to convert the slope angle and the activity into a complex number for each pixel, of modulus equal to the activity and argument equal to twice the slope angle and expressing said complex numbers in Cartesian coordinates to form a Cartesian slope signal;

a slope filter configured to filter the Cartesian slope signal with a linear spatial filter to derive a slope measure;

a color difference unit configured to calculate from the array at each of the pixels a color difference signal associated with each other color;

a slope-adaptive interpolation filter steered by said slope measure configured to interpolate said color difference signals; and a combiner configured to combine said interpolated color difference signals and said first decoded color value output to derive at least second and third decoded color value outputs.

2. The apparatus of claim 1, wherein the selected color is green and the other colors are red and blue.

3. The apparatus of claim 1, wherein the activity measure measures a gradient.

4. The apparatus of claim 3, wherein the activity measure forms the absolute value of a gradient at each pixel and applies a spatial filter.

5. The apparatus of claim 1, wherein the slope-adaptive interpolation filter comprises a set of differently angled interpolation filters, from which at least one filter is selected according to the slope measure.

6. The apparatus of claim 5, wherein a cross-fade is formed from two filters selected according to the slope measure.

7. The apparatus of claim 1, further comprising a mixer configured to form a mix between said color difference signals and said interpolated color difference signals and a mix control unit configured to predict the appropriateness of slope-adaptive interpolation.

8. The apparatus of claim 7, wherein the slope-adaptive interpolation filter comprises a set of differently angled interpolation filters, from which at least one filter is selected according to the slope measure, each filter comprising a pair of one sided filters and wherein said mix control unit comprises a slope consistency unit configured to filter the Cartesian slope signal using pairs of said one-sided filters.

9. An imaging system comprising a light sensor array, a Bayer mask and an apparatus for decoding a Bayer-mask or like coded image comprising a value for one of a set of colors at each pixel of the image to provide a decoded value for each of the set of colors at each pixel of the image including:

a first interpolation filter configured to derive from the image an array having for a selected color a value at each pixel of the image, said array forming a first decoded color value output;

a slope detector configured to calculate a slope at each pixel of the array, expressed as a slope angle;

an activity measure configured to calculate an activity at each pixel;

a converter configured to convert the slope angle and the activity into a complex number for each pixel, of modulus equal to the activity and argument equal to twice the slope angle and expressing said complex numbers in Cartesian coordinates to form a Cartesian slope signal;

a slope filter configured to filter the Cartesian slope signal with a linear spatial filter to derive a slope measure;

a color difference unit configured to calculate from the array at each of the pixels a color difference signal associated with each other color;

a slope-adaptive interpolation filter steered by said slope measure configured to interpolate said color difference signals; and a combiner configured to combine said interpolated color difference signals and said first decoded color value output to derive at least second and third decoded color value outputs.

10. A method in a processor of decoding a Bayer-mask or like coded image comprising a value for one of a set of colors at each pixel of the image to provide a decoded value for each of the set of colors at each pixel of the image, comprising the steps of:

deriving from the image an array having for a selected color a value at each pixel of the image, said array forming a first decoded color value output;

calculating a slope at each pixel of the array, expressed as a slope angle;

calculating an activity at each pixel;

converting the slope angle and the activity into a complex number for each pixel, of modulus equal to the activity and argument equal to twice the slope angle;

expressing said complex numbers in Cartesian coordinates to form a Cartesian slope signal and filtering the Cartesian slope signal with a linear spatial filter to derive a slope measure;

calculating from the array a color difference signal at each of the pixels associated with each other color; interpolating said color difference signals using a slope-adaptive interpolation filter steered by said slope measure; and combining said interpolated color difference signals and said first decoded color value output to derive at least second and third decoded color value outputs.

11. The method of claim 10, wherein the selected color is green and the other colors are red and blue.

12. The method of claim 10, wherein the step of calculating an activity at each pixel comprises measuring a gradient.

13. The method of claim 10, wherein the step of calculating an activity at each pixel comprises forming the absolute value of a gradient at each pixel and applying a spatial filter.

14. The method of claim 10, wherein the slope-adaptive interpolation filter comprises a set of differently angled interpolation filters, from which at least one filter is selected according to the slope measure.

15. The method of claim 14, wherein the at least one filter is selected in accordance with a quantized slope angle.

16. The method of claim 14, wherein said interpolated color difference signals are formed from a cross-fade between two filters.

17. The method of claim 10, wherein a mix is formed between said color difference signals and said interpolated color difference signals, controlled by a measure predicting the appropriateness of slope-adaptive interpolation.

* * * * *